United States Patent [19]

Lamper et al.

[11] Patent Number: 5,532,882
[45] Date of Patent: Jul. 2, 1996

[54] ELECTRO-OPTICAL SCANNING UNIT HAVING ADJUSTABLE CONNECTING ELEMENTS BETWEEN LINEAR ARRAYS OF ELECTRO-OPTICAL AND LENS-UNITS

[75] Inventors: Anthonie H. Lamper, Tegelen; Hans Reinten, Velden, both of Netherlands

[73] Assignee: OCE-Nederland, B.V., Venlo, Netherlands

[21] Appl. No.: 301,494

[22] Filed: Sep. 7, 1994

[30] Foreign Application Priority Data

Sep. 13, 1993 [NL] Netherlands ............... 9301576

[51] Int. Cl.⁶ .................................................. G02B 7/02
[52] U.S. Cl. ........................................ 359/819; 359/821
[58] Field of Search ........................... 359/819, 821, 359/811, 818; 355/46; 347/12, 13; 385/136, 33

[56] References Cited

U.S. PATENT DOCUMENTS

| | | | |
|---|---|---|---|
| 4,322,063 | 3/1982 | Fischbeck et al. | 267/160 |
| 4,728,981 | 3/1988 | Koek | 355/1 |
| 4,913,526 | 4/1990 | Hediger | 359/819 |
| 5,274,732 | 12/1993 | Farnand | 385/136 |
| 5,343,271 | 8/1994 | Morishige | 355/53 |

FOREIGN PATENT DOCUMENTS

90/03015  3/1990  European Pat. Off. .

OTHER PUBLICATIONS

Research Disclosure, Apr. 1992, pp. 275–277.

*Primary Examiner*—Georgia Y. Epps
*Assistant Examiner*—Ricky Mack
*Attorney, Agent, or Firm*—Birch, Stewart, Kolasch & Birch

[57] ABSTRACT

An electro-optical scanning unit which comprises a linear LED array and a linear lens array for imaging slitwise onto a photoconductive drum with light is emitted by the LED's, and a holder for the lens array is connected by leaf springs to a holder for the LED array, the leaf springs connecting the holders in the middle of the arrays and at some distances therefrom and permitting adjustment of the lens array in a direction (Y-direction) perpendicular to the optical axis plane of the lens array and in a direction (Z-direction) parallel to said optical axis plane, the lens holder consisting of two parts which are glued to the lens array and which together form a diaphragm for the lens array.

10 Claims, 4 Drawing Sheets

ELECTRO-OPTICAL SCANNING UNIT HAVING ADJUSTABLE CONNECTING ELEMENTS BETWEEN LINEAR ARRAYS OF ELECTRO-OPTICAL AND LENS-UNITS

BACKGROUND OF THE INVENTION

Field of the Invention

The invention relates to an electro-optical scanning unit and, more specifically, to an electro-optical scanning unit having improved scanning quality.

Discussion of Related Art

An electro-optical scanning unit as herein under consideration is described in European patent application 92201836.1. In the electro-optical scanning unit described therein, the connecting elements serve to allow relative movement of the arrays solely in their longitudinal direction. One disadvantage of this is that to obtain a qualitatively good scanning the positional accuracy of the lens array with respect to the array of electro-optical elements must meet high requirements, and the same applies to the imaging place, in directions other than their longitudinal direction, and the straightness and optical quality of the arrays. In practice, however, linear lens arrays deviate from the straight, particularly if they are long and have not yet been secured to a holder, and the attainable positional accuracy of a lens array is affected by the dimensional tolerances of the lens arrays themselves and the elements by means of which they are interconnected. Such tolerance deviations have a negative influence on the scanning quality.

SUMMARY OF THE INVENTION

Therefore, it is an object of the present invention to provide an electro-optical scanning unit which will overcome the above noted disadvantages.

Still a further object of the present invention is to eliminate tolerance deviations of the linear lens arrays and the elements by means of which the lens units are interconnected.

The foregoing objects and others are accomplished in accordance with the present invention, generally speaking, by providing an electro-optical scanning unit comprising a linear array of electro-optical elements fixed on an elongate optical holder, a linear array of lens units fixed to a lens holder, which linear lens array extends substantially parallel to the electro-optical array elements, and connecting elements which, as considered in a direction transverse to the longitudinal direction of the lens and optical arrays, extend on either side thereof and which, at each of their ends, are connected to one of the holders. Each connecting element is rotatable with respect to a holder connected to one of the ends of the connecting element, about a line which extends in the longitudinal direction of the arrays, to form a parallelogram between the connecting elements and the holders. Consequently, the lens array is adjustable with respect to the array of electro-optical elements for adjustment of maximum light transmission through the lens array. If the connecting elements are leaf springs, the leaf plane of which is situated substantially parallel to a plane passing through the two arrays, this achieves adjustability of the lens array without affecting the focusing thereof, in a simple but efficient manner.

In one attractive embodiment of an electro-optical scanning unit according to the invention, the lens holder forms a slit diaphragm for the lens array. Consequently, when the lens array is adjusted in a direction perpendicular to the plane passing through the arrays, an optimum position of the diaphragm is maintained with respect to the lens array.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DISCUSSION OF THE INVENTION

Figure 1:
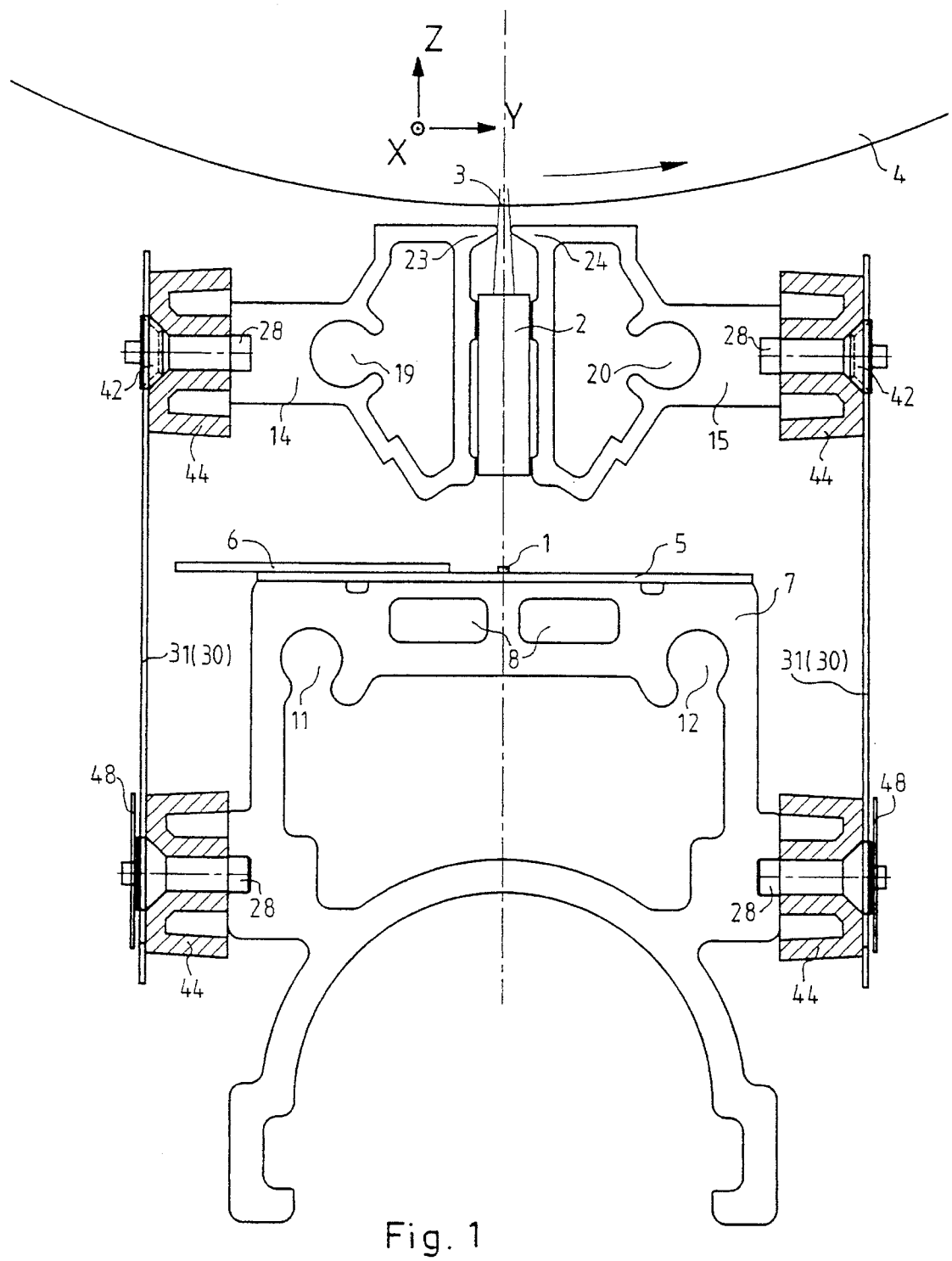
FIG. 1 is a cross-section of an electro-optical scanning unit according to the invention.
Figure 2:
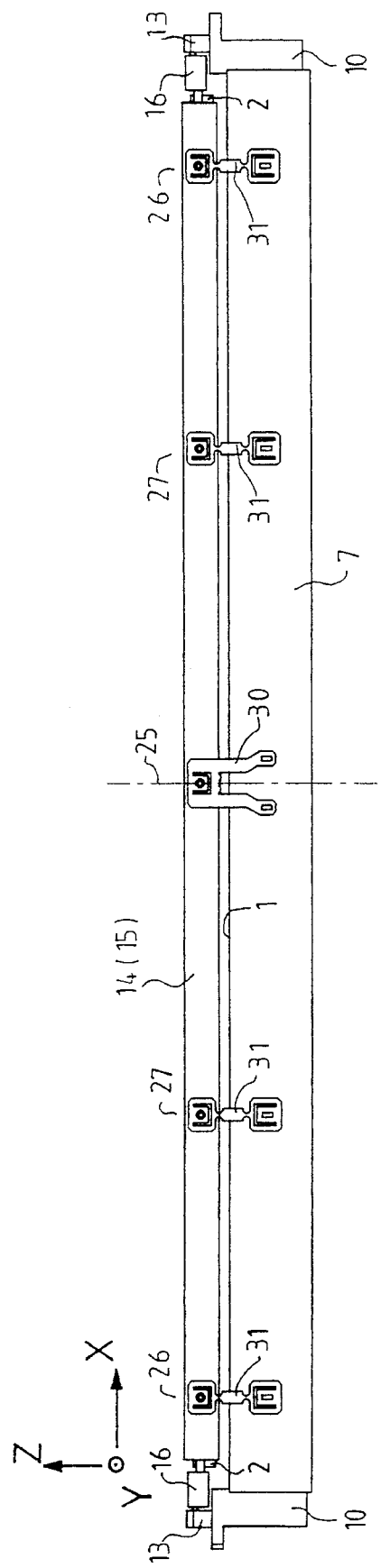
FIG. 2 is a side elevation of the electro-optical canning unit according to FIG. 1.

The electro-optical scanning unit shown in FIG. 1 comprises a linear LED array 1 and a Selfoc lens array 2 at a specific distance from the LED array for focusing light emitted by the LED's on to a narrow strip 3 of the surface of a photoconductive drum 4. The LED array 1 is mounted on a baseplate 5 together with the connected electronics 6 for selective control of the LED's, the baseplate 5 being releasably secured on a holder consisting of an extruded aluminum profile 7 provided with channels 8 through which cooling fluid can flow to dissipate heat produced by the LED's. An end block 10 shown in FIG. 2 is secured to each of the two ends of the aluminum profile 7 by means of screws fitting in holes 11 and 12 formed in profile 7. A block 13 can be secured by screws to each of these end blocks 10. Finally, blocks 13 carry the ends of extruded aluminum profiles 14 and 15 which together form a holder for the lens array 2. For this purpose, an intermediate member 16 is secured to each end of the lens holder 14, 15 by means of pins 17 and 18 which fit in holes 19 and 20 formed respectively in profiles 14 and 15, which intermediate member 16 is connected to block 13 by a pin 21 and slot 22 connection. The connection between the ends of the lens holder 14, 15 and the intermediate members 16 at the ends of the LED array is adjustable to allow for rough dimensional tolerances, as will be explained hereinafter.

The lens holder, in the form of aluminum profiles 14 and 15 between which the lens array 2 is glued, is also connected to the holder 7 for the LED array 1, by means of two groups of five spacers 30, 31 which connect the lens holder 14, 15 and the LED array holder 7 to one another at regular intervals of, for example, 200 mm over the length of the arrays. Each of the extruded profiles 14 and 15 is provided with an edge 23, 24, respectively, which together form a slit diaphragm having a width of, for example, 1 mm to prevent access of stray light to strip 3. The sides of the lens holder 14, 15 and the equally wide LED array holder 7 are situated in flat planes substantially parallel to the plane passing through the LED array 1 and the lens array 2, and are provided with screw holes 28 in the middle 25, at the ends 26 and half way therebetween 27, as shown in FIG. 2, to fix the spacers 30 in the middle 25 against the holders 7 and 14, 15 and the spacers 31 outside the middle 26, 27 against the holders 7 and 14, 15, as will be explained in detail hereinafter with reference to FIGS. 3–6.

For exact focusing on the basis of a maximum quantity of light emitted by the LED's, the linear lens array 2 must be aligned in different directions with respect to the LED array 1. In the longitudinal direction of the lens arrays, hereinafter referred to as the X-direction, it is important that the arrays should be able to expand with respect to one another as a result of any temperature differences occurring between the arrays. In the direction perpendicular to the plane passing through the arrays and corresponding to the direction of rotation of the photoconductive drum 4, which direction is hereinafter referred to as the Y-direction, it is important that the lens array should be as straight as possible above the LED array to intercept the maximum amount of light emitted by the LED's. In the direction of the optical axis of the lenses, hereinafter referred to as the Z-direction, it is important that the lens array 2 should be in a defined position between the LED array 1 as the object plane and the photoconductive drum 4 as the image plane.

To achieve a correct position of the lens array 2 without extreme demands having to be made of the accuracy of the constituent parts of the scanning unit, the lens array 2 is adjustable in both the Y-direction and the Z-direction in order to enable the lens array 2 to be brought into an optimum position with respect to the LED array 1 and the photoconductive drum 4, while free mobility in the X-direction is maintained.

Figure 3:
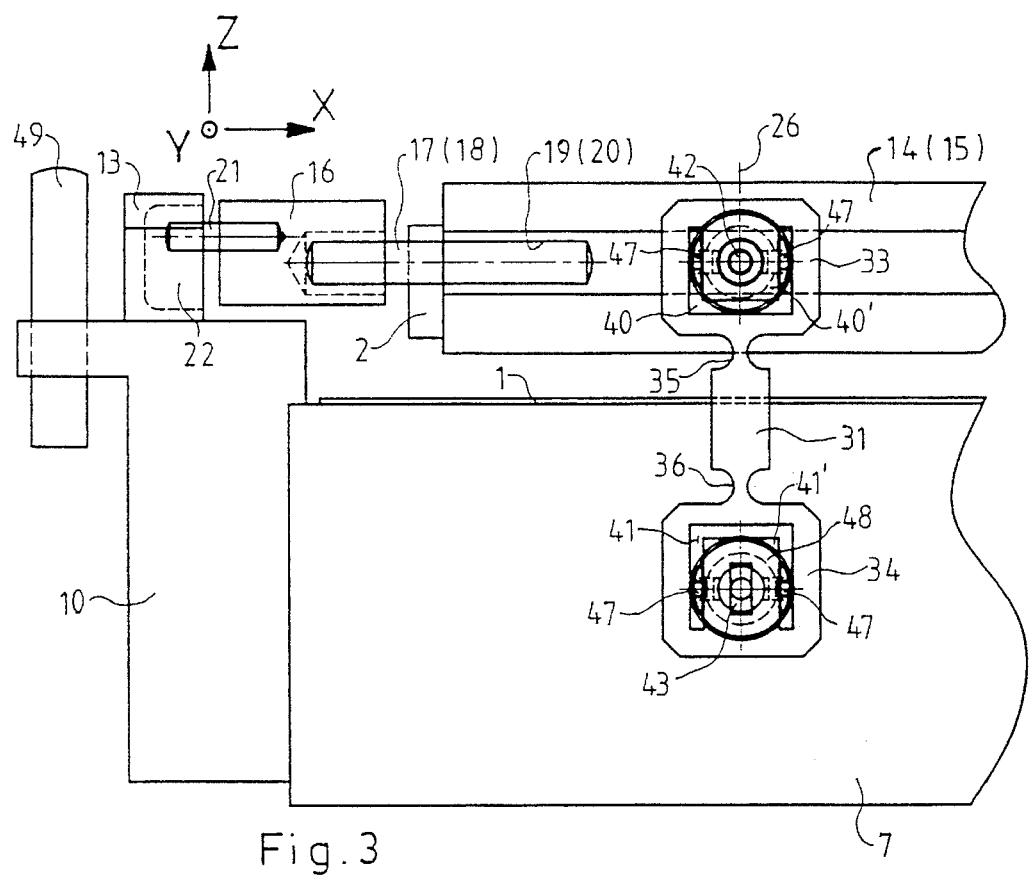
FIG. 3 is a side elevation in detail of one end of the electro-optical scanning unit according to FIG. 2.
Figure 4:
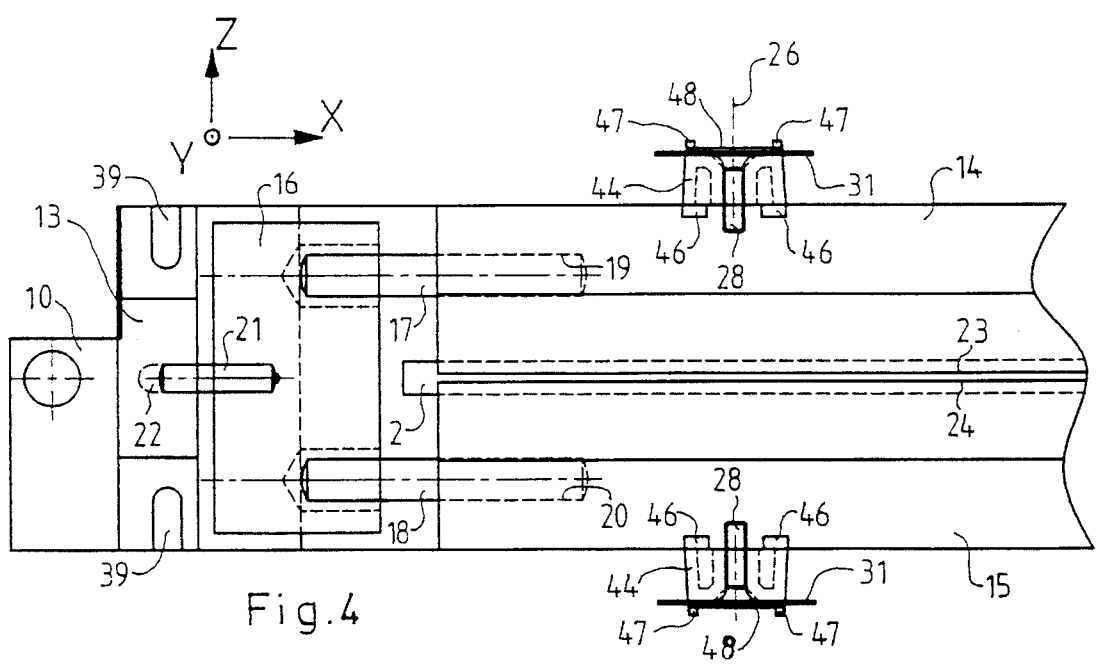
FIG. 4 is a top plan view of the detail according to FIG. 3.

To achieve adjustability of the lens array 2 in the Y-direction and in the Z-direction, the spacers 30 and 31 are constructed in the form of leaf springs, the leaf plane being parallel to the plane passing through the LED array 1 and the optical axis of the lens array 2, for mutual mobility in the Y-direction, and the fixing of each leaf spring to the LED array holder 7 is adjustable in the Z-direction. By providing the leaf springs 31 with constrictions 35 and 36 respectively near the widened ends 33 and 34, the leaf springs 31 act not only as springs in the Y-direction, but also as elastic hinges in the X-direction. The leaf springs 30 in the middle of the arrays are not provided with constrictions and, therefore, do not act as elastic hinges. In the event of increased temperature of the lens array 2, as a result of the heat emission of the photoconductive drum and/or of the LED's, to the non-cooled lens holder 14, 15, this holder can expand, due to the stiffness of the leaf springs 30, in the X-direction from the middle to the ends with elastic deformation of the leaf springs 31 at the constrictions 35 and 36. In order to prevent lens movement in the Y-direction in the event of expansion as a result of temperature increase of a lens array 2 adjusted in the Y-direction and the Z-direction, pin 21 fits in the intermediate member 16 in the slot 22 extending in the Z-direction in block 13, as shown in FIGS. 3 and 4. Lens drifting in the Z-direction of an adjusted lens array is prevented by the fact that the leaf springs 30 and 31 are stiff in the Z-direction (the direction of their length). For adjustment of the lens array 2 in the Y-direction, blocks 13 have slots 39 extending in the Y-direction. After adjustment of the lens array in the direction, blocks 13 are fixed by screws through the slots 39 on end blocks 10.

Figure 5:
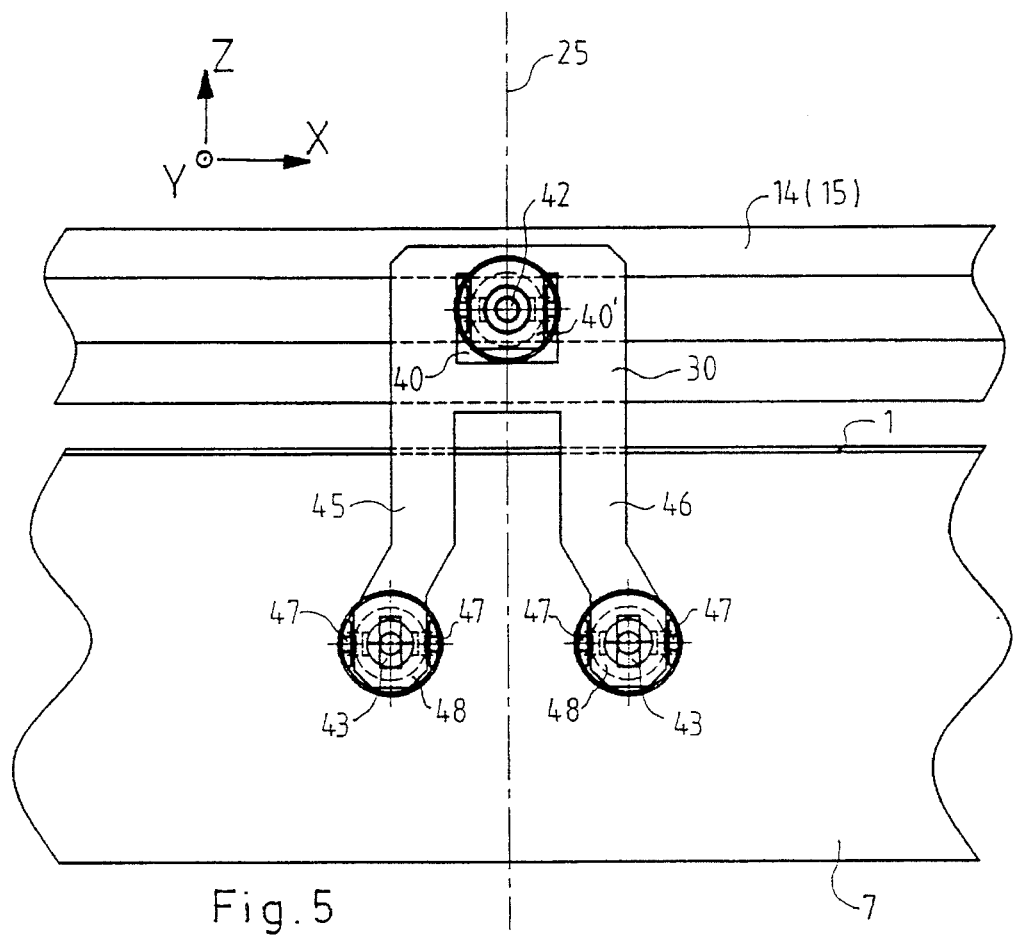
FIG. 5 is a detail of the center of the side elevation according to FIG. 2.
Figure 6:
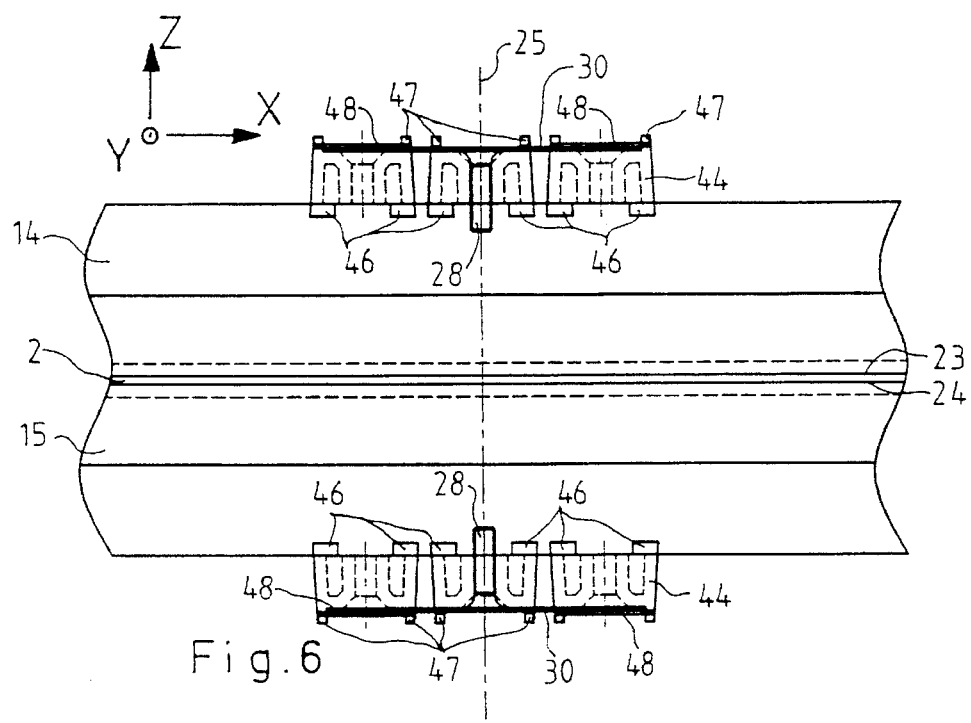
FIG. 6 is a top plan view of the detail according to FIG. 5.

For adjustment of the lens array 2 in the Z-direction, lens holder 14, 15 is moved in that direction into a shape in which each lens of the array images focuses, as sharply as possible in strip 3 of the photoconductive drum, the light emitted by the LED's and is fixed in the (curved) shape by fixing the leaf springs 30 and 31 to the holders 7 and 14, 15. To fix the leaf springs 31 to the lens array holder 14, 15, the widened end 33 of the leaf spring is provided with a U-shaped recess 40 and for fixing to the LED array holder the widened end 34 is also provided with a U-shaped recess 41, the legs of the U-shaped recesses 40 and 41 extending away from one another. A hole 42 with an upright edge is formed in each of the lips 40' formed by the U-shaped recesses 40 and a slot 43 is formed in each of the lips 41' formed by the U-shaped recesses 41, which slot 43 extends in the direction of the length of the leaf spring 31. Each leaf spring 31 is screwed tightly to the associated holder by screws through holes 42 and 43 with the interposition of a spacer tube 44 between the leaf spring and each holder. The upright edge of hole 42 fits in a countersunk hole formed in spacer tube 44 to ensure that a fixed leaf spring 31 occupies a fixed position with respect to the lens holder 14, 15. Because of the slot 43, a fixed leaf spring 31 can occupy a position which is variable in the Z-direction with respect to the LED array holder 7. The leaf springs 30, which interconnect the arrays in their centers are not constructed as elastic hinges but, as already stated, are of U-shaped construction as shown in FIGS. 5 and 6, to give sufficient stiffness in the X-direction, while each leg 45 and 46 of the U-shaped leaf spring 30 can be fixed on the LED array holder 7 in a manner corresponding to the fixing of a leaf spring 31 to the holder 7, it being possible for leaf spring 30 to be fixed on the lens holder 14, 15 in a manner corresponding to leaf spring 31. Viewed in the X-direction, the legs 45 and 46 of leaf springs 30 together have a much larger dimension than the constrictions 35 and 36 of the leaf springs 31. This avoids pressure on the legs 45, 46 of leaf springs 30 resulting in bending when the lens array adjustment in the Z-direction is such that the ends of the lens array are to be closer to the LED array than the center. Each screw connection between the leaf springs 30 and 31 and the holders 7 and 14, 15 has facilities which prevent any torque being exerted on the leaf spring in the X-Z plane, such as might influence the position of the leaf spring in that plane, when the screw is being tightened. For this purpose, each spacer tube 44, on the side facing the holder, is provided with lugs 46 which fit in a groove in the X-direction in the holder, while on the opposite side it has lugs 47 in which a circlip 48 fits by means of recesses. Circlip 48 and spacer tube 44 are thus non-rotatable with respect to the associated holder. Each spacer tube is also formed with a groove through which the lip of a leaf spring fits with minimum clearance. When the screw is turned, the head of the screw applies pressure to the circlip 48, so that the latter clamps the lip of the leaf spring as it is deflected, without exerting a torque thereon.

The sequence of assembly and adjustment operations with the electro-optical scanning unit is as follows.

A loose lens array 2, which is limp in the Y-direction particularly in the case of a length of about 1000 mm, and which can also easily be twisted, is first applied straight to a stiff lens holder in order to form a stiff unit therewith. For this assembly, the lens array is placed in an accurately straight position on a flat table. One of the lens holder parts, e.g. part 14, is provided with a layer of glue and pressed lightly on the lens array so that no stresses are introduced into that lens holder part such as might later cause the lens array to bend. After the layer of glue has set, the other lens holder part 15 is also glued with light pressure to the other side of the lens array. The resulting lens assembly, in which pins 17 and 18 are pressed into holes 19 and 20 respectively, is placed between blocks 16, the pins falling into the holes formed in blocks 16, as shown in FIGS. 3 and 4. The lens array holder 14, 15 is then placed in a position in which the lens array 2 is in a straight line with the pins 21 in slots 22. In this position, the remaining space of the holes in the blocks 16 is filled with glue to form a fixed unit of lens holder 14, 15 and blocks 16.

The LED array and the lens array at a distance therefrom is then measured in respect of optical quality in an optical measuring rig and at a number of different places in the X-direction. In this connection, the quantity of light emitted by the LED's and reaching the image plane via the diaphragm slit is first measured at each of the places. The lens array is moved in the Y-direction at each measuring place to find a lens array position in which the amount of light passed is maximum. The attempt is then made to find an optimum position of the lens array in the Z-direction by measuring the image quality again at a number of different places in the X-direction, minimal in the middle and at the ends of the arrays. For the adjustment of the lens array in the Z-direction, attention is paid to an optimum combination of the positions of the lens array and the image plane (the plane in which the light of the LED's is imaged on the photoconductive surface) with respect to the LED array. These positions are determined by placing a light detector in the intended image plane, first at a fixed distance TC=nominal object distance V+nominal image distance B from the lens, and by moving the lens array in the direction of the LED array with respect to the associated measuring place in order to find a lens position in which an optimum detection signal is obtained, at which position the distances V and B are equal. From the position found, both the detector and the lens array are then moved in the Z-direction, in which therefore the TC changes but V remains equal to B, in order to find for the associated measuring place a lens array position in which a maximum detection signal is obtained. From the various measurements carried out over the length of the arrays, the optimum values thus determined for the object distance are used to calculate a deflection curve which is as close as possible (fitting) to these values.

After the optimum position of the lens array has been adjusted in the Z-direction, the position in the Y-direction may no longer be optimum, e.g. if the optical axis of the lenses is not absolutely parallel to the Z-direction. In that case, the adjustment in the Y-direction can again be corrected after determining the lens array in the Z-direction.

Along the optimum lens positions thus determined for the Y-direction at the measuring places, a straight line is drawn which approximates these positions as much as possible. When measurements are carried out at a measuring place, the edges 23 and 24 of the diaphragm moving with the lens movement in the Y-direction define an area in which the straight line must lie. By moving the blocks 13 in the Y-direction, the lens array 2 is set in accordance with the specific line, whereupon the blocks 13 are tightened by screws through slots 39. Since the edges 23 and 24 of the diaphragm slit are firmly connected to the lens holder 14, 15, the same are automatically also adjusted and there is therefore no need for a separate diaphragm adjustment.

The lens array is then bent in accordance with the calculated deflection curve, by the application of forces to the ends of leaf springs 30 screwed tight in the Z-direction at the center 25 and fixing the lens array in this position by first tightening the leaf spring 31 at the ends 26 and then the leaf springs 31 between the center 25 and the ends 26.

By fixing the leaf springs 30, 31 from the center 25 to the ends, first 27 and then 26, and, after each pair of leaf springs has been fixed on either side of the lens array, bending the free length of the lens array into a position in which the lenses of the lens array come into an optimum Z-position at the site of the next leaf springs for fixing, the lens array can be curved in accordance with a higher degree curve, in which the maximum values of the detection signal are approximated more closely. However, this is at the expense of greater bending stresses introduced into the lens array, requiring a stiffer and hence also heavier scanning unit. By making the flat leaf springs 30 and 31 with fixing lips which, as considered in the direction of the length of the leaf springs, extend from the end to the center, the length over which the leaf spring can bend in the Y-direction becomes greater than the distance between the fixing points. On deflection, the leaf springs 31 assume a Z-shaped position as it were. As a result the bending per unit length is less, so that for a given movement of the fixing points of a leaf spring with respect to one another in the Y-direction a relatively minor bending stress is produced in the leaf spring, tending to bend the lens array from the adjusted straight line to the Y-direction.

On assembly of an adjusted electro-optical scanning unit according to the present invention in an electrophotographic printer, the end blocks 10 are so set at a distance from the image plane at the narrow strip 3 by means of setscrews 49 supported on rings on either side of the photoconductive drum, that the TC-value determined in the manner indicated above is achieved as far as possible. In operation, pressure contact between the setscrews 49 and the photoconductor unit ensures that this distance is maintained despite oscillation of the photoconductive drum 4. The electro-optical scanning unit according to the invention can also be used for scanning an original with a lens array, e.g. a Selfoc array, for imaging on a CCD array.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An electro-optical scanning unit comprising a linear array of electro-optical elements fixed on an elongate optical holder, a linear array of lens units fixed to a lens holder, which lens array extends substantially parallel to said electro-optical array, and connecting elements which, as considered in a direction (Y-direction) transverse to a longitudinal direction (X-direction) of said arrays, extend on either side thereof and which, at each of their ends, are connected to one of said optical and lens holders, wherein each connecting element is rotatable with respect to each holder connected to one of said ends of said connecting element, about a line which extends in said longitudinal direction of said arrays, to form a parallelogram between said connecting elements and said lens and elongated optical holders.

2. An electro-optical scanning unit according to claim 1, wherein said connecting elements are leaf springs, a leaf plane of which is situated substantially parallel to a plane (X–Z plane) passing through said lens and electro-optical arrays.

3. An electro-optical scanning unit according to claim 1 or 2, wherein said lens holder forms a slit diaphragm for said lens array.

4. An electro-optical scanning unit according to claim 3, wherein said lens holder is assembled from two parts, each of which form edges of said slit diaphragm and which constitute sides of said lens array.

5. An electro-optical scanning unit according to claim 4, wherein said lens holder parts are fixed to said lens array.

6. An electro-optical scanning unit according to claim 2, wherein said connecting elements on either side of said arrays are formed by at least three leaf springs including at least one middle leaf spring and lateral leaf springs which connect said elongated optical and lens holders respectively in the center of said lens and electro-optical arrays and at some distance on either side of said center.

7. An electro-optical scanning unit according to claim 6, wherein said middle leaf springs, as considered in the direction of the length (X-direction) of said lens and electro-optical arrays, form a rigid connection and said remaining leaf springs form an elastic connection in said direction (X-direction).

8. An electro-optical scanning unit according to claim 7, wherein each of said leaf springs is connectible, at a fixed point at one end to said lens holders and, at the other end, is connectible to the said elongated optical holder at an adjustable place for adjustment of the distance between said lens and electro-optical arrays.

9. An electro-optical scanning unit according to claim 8, wherein said adjustable connection between said leaf springs and elongated optical holder is a releasable clamp connection formed by a resilient element which is kept at a distance from said elongated optical holder and which is movable solely in said Y-direction for clamping said leaf springs between said elongated optical holder and said resilient element without rotation.

10. An electro-optical scanning unit according to any one of claims 6 to 9, wherein at least one of said lateral leaf springs has a length greater than the distance between the places where said optical and lens holders are interconnected via said lateral leaf springs and has facing ends which are connected to said lens and elongated holders.

* * * * *